(12) United States Patent
Gao et al.

(10) Patent No.: US 11,912,323 B2
(45) Date of Patent: Feb. 27, 2024

(54) TRAIN CONTROL METHOD, SYSTEM, COMPUTER DEVICE AND STORAGE MEDIUM

(71) Applicant: Traffic Control Technology Co., Ltd, Beijing (CN)

(72) Inventors: Chunhai Gao, Beijing (CN); Feng Bao, Beijing (CN); Lu Yu, Beijing (CN); Lei Zhang, Beijing (CN)

(73) Assignee: Traffic Control Technology Co., Ltd, Beijing (CN)

( * ) Notice: Subject to any disclaimer, the term of this patent is extended or adjusted under 35 U.S.C. 154(b) by 267 days.

(21) Appl. No.: 17/563,089

(22) Filed: Dec. 28, 2021

(65) Prior Publication Data

US 2023/0080474 A1 Mar. 16, 2023

(30) Foreign Application Priority Data

Sep. 16, 2021 (CN) .......................... 202111088838.7

(51) Int. Cl.
 *B61B 1/00* (2006.01)
 *B61L 27/40* (2022.01)
 (Continued)

(52) U.S. Cl.
 CPC ............. *B61L 3/008* (2013.01); *B61L 25/021* (2013.01); *B61L 25/025* (2013.01); *B61L 27/04* (2013.01); *B61L 2205/04* (2013.01)

(58) Field of Classification Search
 CPC .......... B61L 3/006; B61L 3/008; B61L 23/34; B61L 25/021; B61L 25/025; B61L 27/04; B61L 27/40; B61L 2205/04; Y02T 10/72
 See application file for complete search history.

(56) References Cited

U.S. PATENT DOCUMENTS

2013/0096741 A1* 4/2013 Jung ....................... B61L 3/006
 701/20
2016/0251025 A1 9/2016 Oldknow et al.

FOREIGN PATENT DOCUMENTS

CN 102981408 B 5/2015
CN 109318946 A 2/2019
(Continued)

OTHER PUBLICATIONS

Yan Jian-peng et al. "Train speed measurement information fusion based on the improved federated Kalman filter algorithm", Journal of Railway Science and Engineering vol. 9 No. 2, dated Apr. 2012, 5 pages.

(Continued)

*Primary Examiner* — Phutthiwat Wongwian
*Assistant Examiner* — Arnold Castro
(74) *Attorney, Agent, or Firm* — East IP P.C.

(57) ABSTRACT

Embodiments of the application provide a train control method, system, computer device and storage medium. A scheme applying the train control method of the application determines a current travelling state of a vehicle under control firstly, and configures different state weights according to different travelling states to determine a corresponding target travelling parameter in a particular travelling state. The scheme can ensure to determine and obtain in real time an optimal target travelling parameter for the vehicle under control according to its current travelling state, regardless of the travelling environment of the vehicle under control, and control the vehicle under control in real time and effectively by the target travelling parameter during a travelling process. Thereby, the real-time performance and control accuracy of vehicle control can be improved, and the control effect of the train control method provided by the embodiments of the application can be further improved.

20 Claims, 8 Drawing Sheets

(51) Int. Cl.
*B61L 27/04* (2006.01)
*B61L 3/00* (2006.01)
*B61L 25/02* (2006.01)

(56) References Cited

FOREIGN PATENT DOCUMENTS

| | | |
|---|---|---|
| CN | 112406959 A | 2/2021 |
| CN | 113120038 A | 7/2021 |
| CN | 113247056 A | 8/2021 |
| WO | 2012119197 A1 | 9/2012 |
| WO | 2018064570 A1 | 4/2018 |

OTHER PUBLICATIONS

Yang Jingwei. "Study on Automatic Train Operation Based on Multi-model Predictive Control", A Dissertation in System Engineering, Yanshan University, dated May 2013, 68 pages.
The extended European search report for European Application No. 21218263.8, dated Jul. 15, 2022, 6 pages.
Zhang Zixuan et al., Cooperative Multi-Scenario Departure Control for Virtual Coupling Trains: A Fixed-Time Approach, vol. 70, No. 9, Sep. 2021 ., 11 pages.
The Grant Notification for Chinese Application No. 202111088838.7, dated Aug. 2, 2022, 6 pages.

\* cited by examiner

TRAIN CONTROL METHOD, SYSTEM, COMPUTER DEVICE AND STORAGE MEDIUM

CROSS REFERENCE TO RELATED APPLICATION

The present application claims the benefit of priority to Chinese Patent Application No. 202111088838.7, filed on Sep. 16, 2021 and titled "TRAIN CONTROL METHOD, SYSTEM, COMPUTER DEVICE AND STORAGE MEDIUM", which is incorporated herein by reference in its entirety.

TECHNICAL FIELD

This application relates to the technical field of vehicle control, and particularly to a train control method, system, computer device and storage medium.

BACKGROUND

With vigorous development of our country's urban rail transit, automated driving has become a major focus of current vehicle research. In automated driving, control of a vehicle is the key to ensuring its safety and intelligence. Currently, model prediction is the main approach for vehicle control.

Control parameters involved in model prediction include state parameters of a vehicle itself, travelling state parameters, and different environmental parameters in the travelling environment. There are so many control parameters involved that it is difficult to tune uniformly. Therefore, currently, model prediction mainly uses fixed parameters. That is to say, a part of the environmental parameters and vehicle state parameters are fixed. It is more accurate to predict data using the fixed parameters when the vehicle is in a fixed environment such as a respective platform etc. However, once the vehicle exits the platform, environmental factors are complex and the vehicle's travelling state will change at any moment, which easily leads to inaccurate prediction results of the model.

BRIEF DESCRIPTION OF THE DRAWINGS

The drawings illustrated here are used to provide a further understanding of the application and constitute a part of the application. Exemplary embodiments of the application and their descriptions are used to explain the application and do not constitute improper limitations of the application. In the drawings.

DETAILED DESCRIPTION

In a process of realizing the application, the Inventor found that the current vehicle control effect is poor.

Regarding the above issue, an embodiment of the application provides a train control method, which obtains multiple travelling parameters of a vehicle under control and a reference vehicle at a current moment firstly, then determines a state weight corresponding to each of the travelling parameters of the reference vehicle in different travelling states from the multiple travelling parameters, determines a travelling constraint corresponding to each of the travelling parameters from the state weight as obtained, and lastly determines a target travelling parameter for the vehicle under control, according to the multiple travelling parameters, the state weight and the travelling constraint corresponding to each of the travelling parameters, to control the vehicle under control by the target travelling parameter.

The embodiment of the application determines a current travelling state of the vehicle under control firstly, and configures different state weights according to different travelling states to determine a corresponding target travelling parameter in a particular travelling state. The scheme can ensure to determine and obtain in real time an optimal target travelling parameter for the vehicle under control according to its current travelling state, regardless of the travelling environment of the vehicle under control, and control the vehicle under control in real time and effectively by the target travelling parameter during a travelling process. Thereby, the real-time performance and control accuracy of vehicle control can be improved, and the control effect of the train control method provided by the embodiment of the application can be further improved.

Solutions in embodiments of the application can be implemented in various computer languages, for example, the object-oriented programming language Java and the literal scripting language JavaScript, and the like.

In order to make technical solutions and advantages of the embodiments of the application clearer, exemplary embodiments of the application will be described in further details below with reference to the accompanying drawings. Obviously, the described embodiments are only a part of the embodiments of the application, and are not exhaustive. It should be noted that the embodiments in the application and features in the embodiments could be combined with each other if there is no conflict.

The application environment of the train control method provided by the embodiment of the application is described briefly below.

Figure 1:
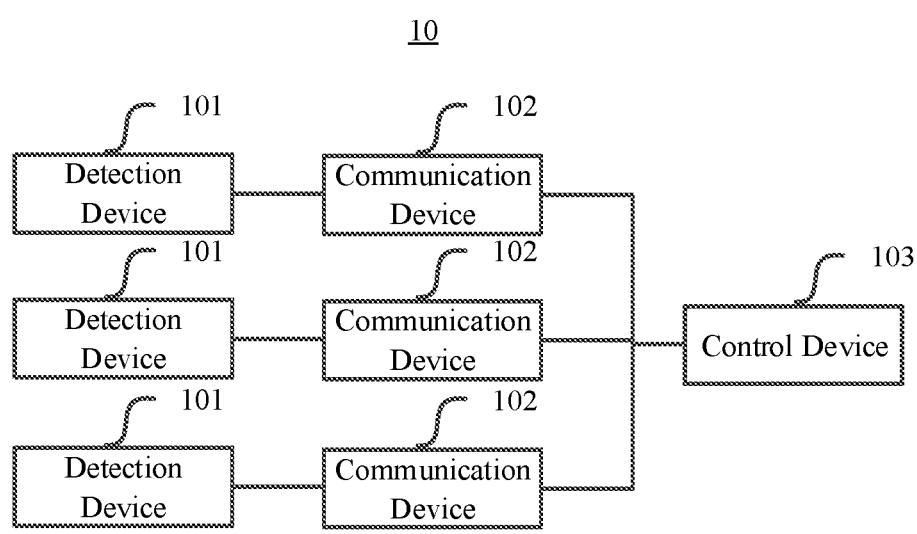
FIG. 1 is a schematic diagram of an application scenario of a train control method provided by an embodiment of the application.

As shown in FIG. 1, the train control method provided by the embodiment of the application is applied to a virtual marshalling train control system 10. The virtual marshalling train control system 10 may include at least detection devices 101, communication devices 102 and a control device 103. Among them, the detection devices 101 may include multiple sensors of different types, such as locators, speedometers, etc. The sensors may be arranged in different vehicles to collect current travelling parameters of each vehicle, such as position, speed, etc. The communication devices 102 may be configured to implement data transmission between each vehicle and the control device 103, such as sending the travelling parameters of a first vehicle to the control device 103 for processing, and sending control data processed by the control device 103 to the vehicle under control. The control device 103 may be configured to receive and process travelling parameters sent by different vehicles, and generate corresponding control parameters, so as to realize the control of the travelling vehicle. The control device 103 may be a server, a computer, a wearable device, or any other device having a data processing function, which is not limited specifically in this embodiment, and can be selected or set specifically according to actual conditions.

Figure 2:
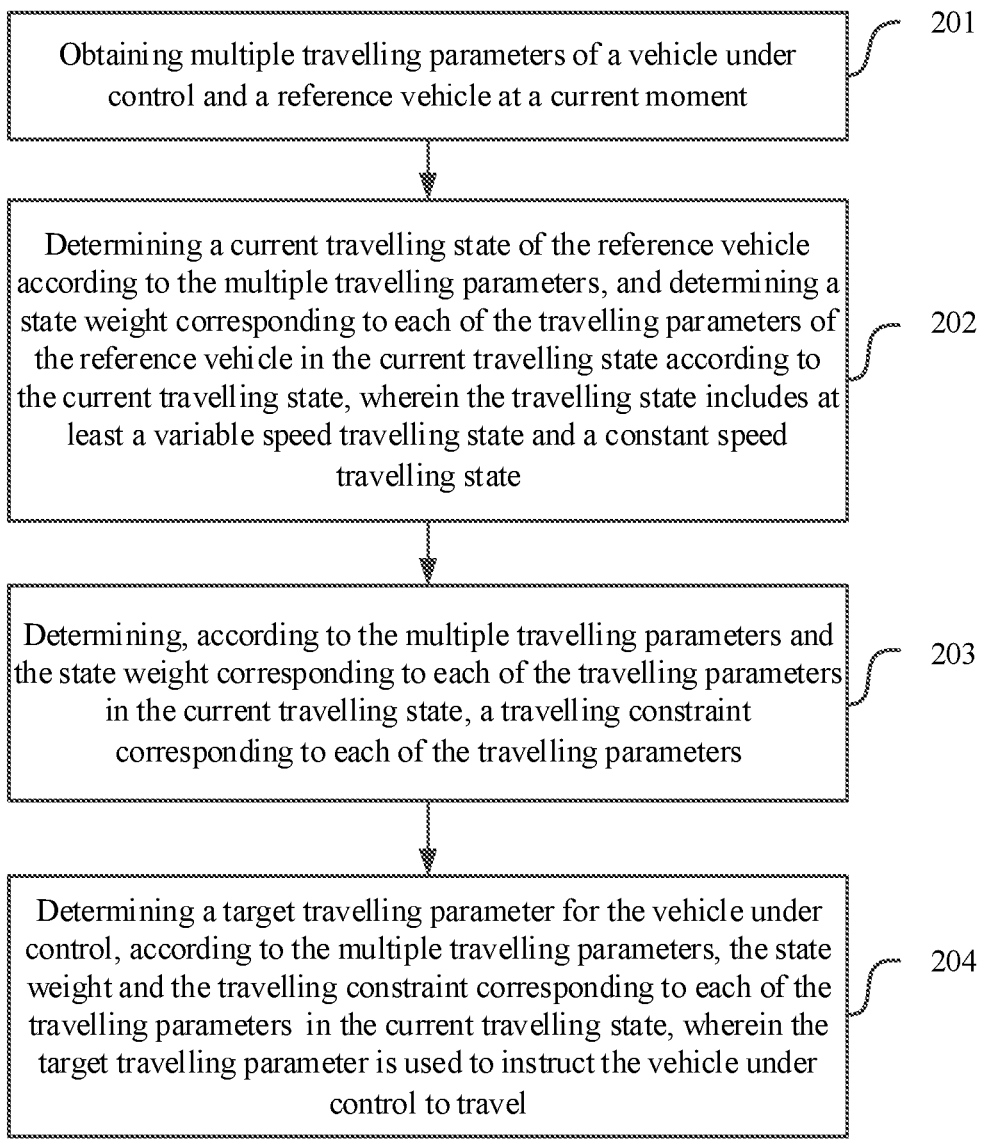
FIG. 2 is a flowchart of a of a train control method provided by an embodiment of the application.

As shown in FIG. 2, an executive entity of the following embodiment may be the above-mentioned control device 103. It is taken as an example to illustrate that a train control method provided by an embodiment of the application may be applied to the above-mentioned control device 103 to control the vehicle under control. The train control method provided by the embodiment of the application includes the following steps 201 to 204.

Step 201: the control device obtains multiple travelling parameters of the vehicle under control and a reference vehicle at a current moment.

Figure 3:
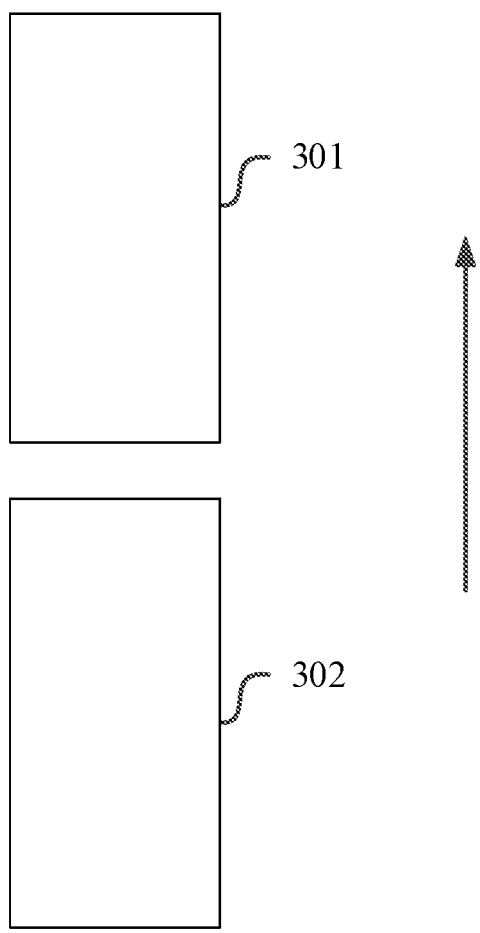
FIG. 3 is a flowchart of a of a train control method provided by an embodiment of the application.

The control device determines a control parameter for controlling the vehicle under control at the next moment, based on the travelling parameters of the vehicle under control and a reference vehicle at the current moment. The travelling parameters refer to state parameters of a vehicle during the travelling process, including, such as a travelling speed, a travelling acceleration, a travelling position, a travelling impact rate, a travelling level, etc. It should be noted that the multiple travelling parameters include at least either the travelling speed or the travelling acceleration. Meanwhile, as shown in FIG. 3, the reference vehicle 301 in this embodiment is located in front of the vehicle under control 302 and is adjacent to the vehicle under control 302.

Step 202: the control device determines a current travelling state of the reference vehicle according to the multiple travelling parameters, and determines a state weight corresponding to each of the travelling parameters of the reference vehicle in the current travelling state according to the current travelling state.

The travelling state includes at least a variable speed travelling state and a constant speed travelling state. The variable speed travelling state refers to that speed of a vehicle changes continuously during the travelling process of the vehicle, such as accelerating or decelerating travelling. The constant speed travelling state refers to that the vehicle travels at a fixed speed. In different travelling states, the multiple travelling parameters have different influences on the travelling state of the vehicle. Therefore, the embodiment determines the state weight corresponding to each of the travelling parameters of the reference vehicle in different travelling states based on the multiple travelling parameters. The embodiment of the application may determine the state weight corresponding to each travelling parameter in the following manner: determining, by the control device, the current travelling state of the reference vehicle according to the travelling speed or travelling acceleration among the multiple travelling parameters, and then assigning, by the control device, different state weights to each travelling parameter according to the current travelling state. The ways to determine the state weight of corresponding to each travelling parameter are not enumerated exhaustively in the embodiment of the application, and may be selected specifically according to actual conditions.

Step 203: the control device determines, according to the multiple travelling parameters and the state weight corresponding to each of the travelling parameters of the reference vehicle in the current travelling state, a travelling constraint corresponding to each of the travelling parameters.

The travelling constraint refers to the upper limit and the lower limit of each travelling parameter during the travelling process. A reasonable travelling parameter range may be determined by the travelling constraint. The control device may redetermine each travelling constraint during the travelling process based on the multiple travelling parameters obtained in step 201 and each state weight determined in step 202.

Step 204: the control device determines a target travelling parameter for the vehicle under control, according to the multiple travelling parameters, the state weight and the travelling constraint corresponding to each of the travelling parameters of the reference vehicle in the current travelling state.

The target travelling parameter is used to instruct the vehicle under control to travel. After obtaining the multiple travelling parameters, each state weight, and each travelling constraint, the control device may determine the target travelling parameter for controlling the vehicle under control by the following ways.

In a first way, the control device may use the travelling constraint corresponding to each travelling parameter as the upper limit and lower limit of the travelling parameter directly, and keep each travelling parameter between the upper limit and the lower limit, so as to reduce the calculation amount greatly on the premise of ensuring stable and safe travelling of the vehicle under control, and further improve the efficiency of vehicle control.

In a second way, the control device may perform weighting processing on the obtained multiple travelling parameters by the state weight corresponding to each travelling parameter, under the travelling constraint corresponding to each travelling parameter, so as to obtain a unique target travelling parameter, and control the vehicle under control by the unique target travelling parameter. The target travelling parameter obtained by this way is unique, which can facilitate control of the vehicle under control, and thus the complexity of control of the vehicle under control can be reduced.

In a third way, the control device may input the obtained multiple travelling parameters and the state weight corresponding to each travelling parameter to a pre-stored prediction model under the travelling constraint of each travelling parameter, and output a corresponding target travelling parameter through the prediction model.

The train control method provided by the embodiment of the application obtains multiple travelling parameters of a vehicle under control and a reference vehicle at a current moment firstly, then determines a state weight corresponding to each of the travelling parameters of the reference vehicle in different travelling states from the multiple travelling parameters, determines a travelling constraint corresponding to each of the travelling parameters from the state weight as obtained, and lastly determines a target travelling parameter for the vehicle under control, according to the multiple travelling parameters, the state weight and the travelling constraint corresponding to each of the travelling parameters, to control the vehicle under control by the target travelling parameter.

The embodiment of the application determines a current travelling state of the vehicle under control firstly, and configures different state weights according to different travelling states to determine a corresponding target travelling parameter in a particular travelling state. The scheme can ensure to determine and obtain in real time an optimal target travelling parameter for the vehicle under control according to its current travelling state, regardless of the travelling environment of the vehicle under control, and control the vehicle under control in real time and effectively by the target travelling parameter during the travelling process. Thereby, the real-time performance and control accuracy of vehicle control can be improved, and the control effect of the train control method provided by the embodiment of the application can be further improved.

Figure 4:
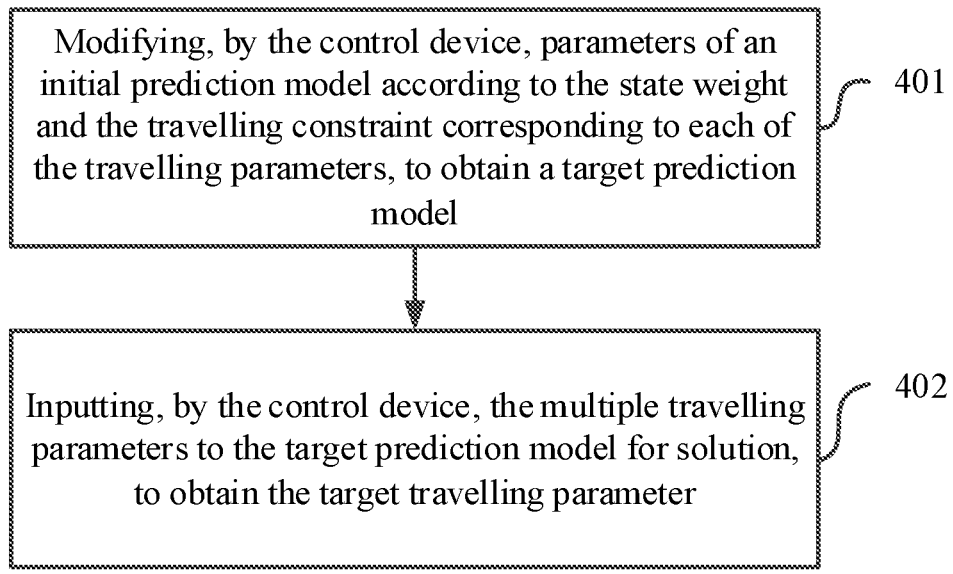
FIG. 4 is a flowchart of a of a train control method provided by an embodiment of the application.

As shown in FIG. 4, in an optional embodiment of the application, the above step 204, where the control device determines a target travelling parameter for the vehicle under control, according to the multiple travelling parameters, the state weight and the travelling constraint corresponding to each of the travelling parameters of the reference vehicle in the current travelling state, may include the following steps 401 to 402.

Step 401: the control device modifies parameters of an initial prediction model according to the state weight and the travelling constraint corresponding to each of the travelling parameters, to obtain a target prediction model.

The initial prediction model is pre-stored in the control device. The initial prediction model may be used to predict vehicle travelling parameters of the next moment based on the vehicle travelling parameters of the current moment. The control device may optimize corresponding control parameters in the initial prediction model based on the currently detected multiple travelling parameters, the state weight and travelling constraint corresponding to each travelling parameter obtained in the above steps 201 to 203 respectively. For example, the target prediction model of the embodiment may be obtained by updating an initial weight of each travelling parameter in the initial prediction model to the current state weight determined in real time, and updating an initial constraint of each travelling parameter in the initial prediction model to the current travelling constraint determined in real time.

Step 402: the control device inputs the multiple travelling parameters to the target prediction model for solution, to obtain the target travelling parameter.

After modifying the initial prediction model to obtain the target prediction model, the control device may input the obtained multiple travelling parameters into the target prediction model, and solve the target prediction model within the constraint range formed by the upper limit of constraint and the lower limit of constraint corresponding to the travelling constraint, so as to obtain the target travelling parameter for controlling the vehicle under control.

The train control method provided by the embodiment of the application can modify the initial prediction model in real time according to the state weight corresponding to each travelling parameter and the travelling constraint in different states, to obtain the target prediction model, and can determine and obtain the target travelling parameter by the target prediction model, which can be more adaptable in different travelling states. Thereby, the intelligence of vehicle control can be improved, and the control effect of the train control method provided by the embodiment of the application can be further improved.

Figure 5:
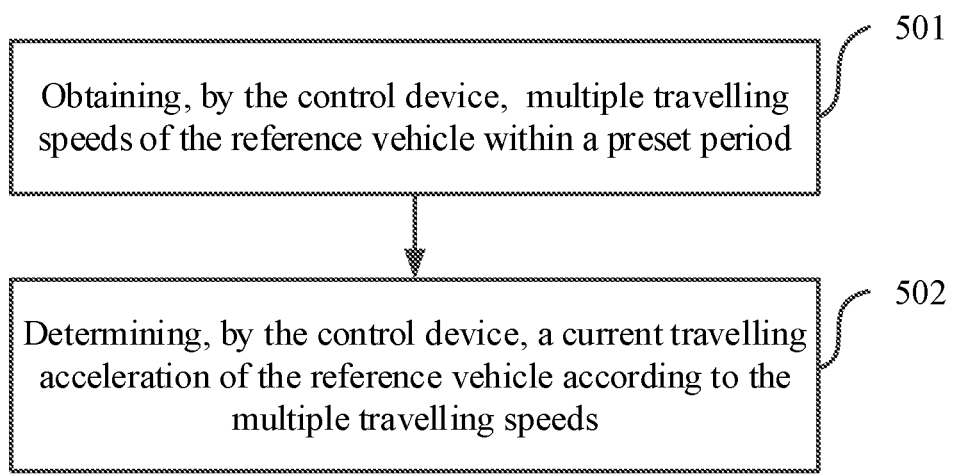
FIG. 5 is a flowchart of a of a train control method provided by an embodiment of the application.

As shown in FIG. 5, in an optional embodiment of the application, the above step 201, where the control device obtains the multiple travelling parameters of the vehicle under control and the reference vehicle at the current moment, may include the following steps 501 to 502.

Step 501: the control device obtains multiple travelling speeds of the reference vehicle within a preset period.

Each travelling vehicle may be equipped with a speedometer and communication device. The speedometer may measure the travelling speed of the reference vehicle in real time, and send the measured travelling speed to the control device in real time through the communication device. The control device then can obtain the travelling speed of the reference vehicle at the current moment in real time. It should be noted that the preset period can be set specifically according to actual experience, for example, it may be 0.1 second (s), 0.2 s, 0.4 s, 1 s etc. before the current moment, which is not limited specifically in this embodiment.

Step 502: the control device determines a current travelling acceleration of the reference vehicle according to the multiple travelling speeds.

The control device can calculate a corresponding travelling acceleration through a formula for acceleration calculation based on the currently obtained multiple travelling speeds. The number of the travelling acceleration(s) may be one or more, which is not limited specifically in this embodiment, as long as the current travelling state of the reference vehicle can be characterized.

The embodiment of the application can reduce types of travelling parameters of an initial stage that need to be obtained, by obtaining the travelling speeds firstly and then calculating the corresponding travelling acceleration based on the obtained travelling speeds. As a result, there is no need to equip equipment such as an accelerometer etc. in the vehicle, and costs for equipping vehicle control hardware equipment can be reduced, so as to further reduce the control cost of the train control method provided by the embodiment of the application.

Figure 6:
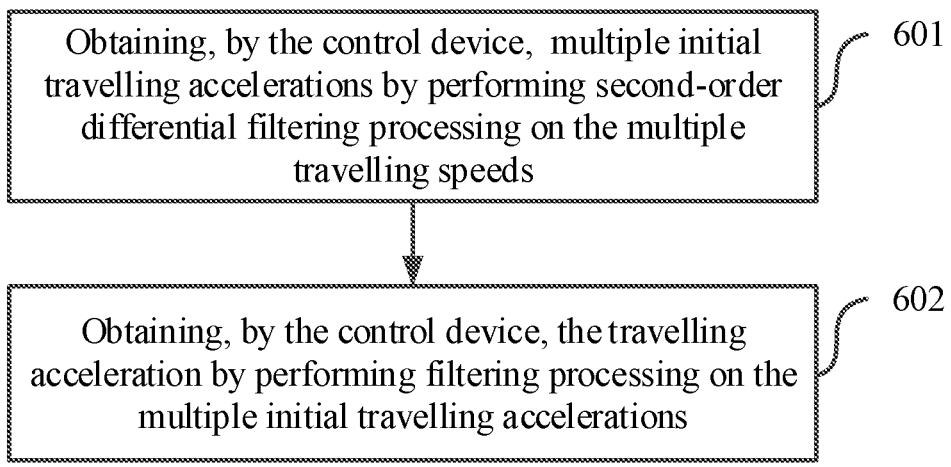
FIG. 6 is a flowchart of a of a train control method provided by an embodiment of the application.

As shown in FIG. 6, in an optional embodiment of the application, the above step 502, where the control device determines the current travelling acceleration of the reference vehicle according to the multiple travelling speeds, may include the following steps 601 to 602.

Step 601: the control device obtains multiple initial travelling accelerations by performing second-order differential filtering processing on the multiple travelling speeds.

After obtaining the multiple travelling speeds, the control device may perform second-order differential filtering processing on the multiple travelling speeds based on second-order differential, and obtain the corresponding acceleration from a difference value between speeds after the differentiation, and at the same time, perform filtering processing on distortions in the travelling speeds. The calculation process can be simplified, while the accuracy of acceleration calculation can be ensured, so as to improve the calculation efficiency. Thereby, the control efficiency can be further improved under the premise of ensuring the accuracy of vehicle control.

Step 602: the control device obtains the current travelling acceleration by performing filtering processing on the multiple initial travelling accelerations.

After obtaining the initial travelling acceleration, the control device may further perform filtering processing on the initial travelling acceleration so as to obtain the final travelling acceleration that can be used. For example, an threshold range of acceleration can be set according to historical experience, and an initial travelling acceleration exceeding the threshold range may be eliminated, rounded up or rounded down, to ensure an rationality of the obtained travelling acceleration and avoid reducing the accuracy of the obtained target travelling parameter caused by abnormal acceleration values introduced due to other conditions such as calculation errors. Thereby, the accuracy of vehicle control can be improved, and the control effect of the train control method provided by the embodiment of the application can be further improved.

The embodiment of the application may perform second-order differential filtering processing on multiple traveling speeds to obtain multiple initial traveling accelerations, then perform filtering processing on the multiple initial traveling accelerations, and finally obtain the traveling acceleration. In this process, the control device may differentiate the travelling speeds based on the second-order differential to calculate the travelling acceleration, and at the same time, perform filtering processing on the travelling speeds and the travelling acceleration respectively for two times, which combines the filtering acceleration calculation into one step, so as to simplify the acceleration calculation process while ensuring the reliability of acceleration calculation. Thereby, a technical effect can be achieved that the control efficiency can be further improved under the premise of ensuring the control reliability of the train control method provided by the embodiment of the application.

Figure 7:
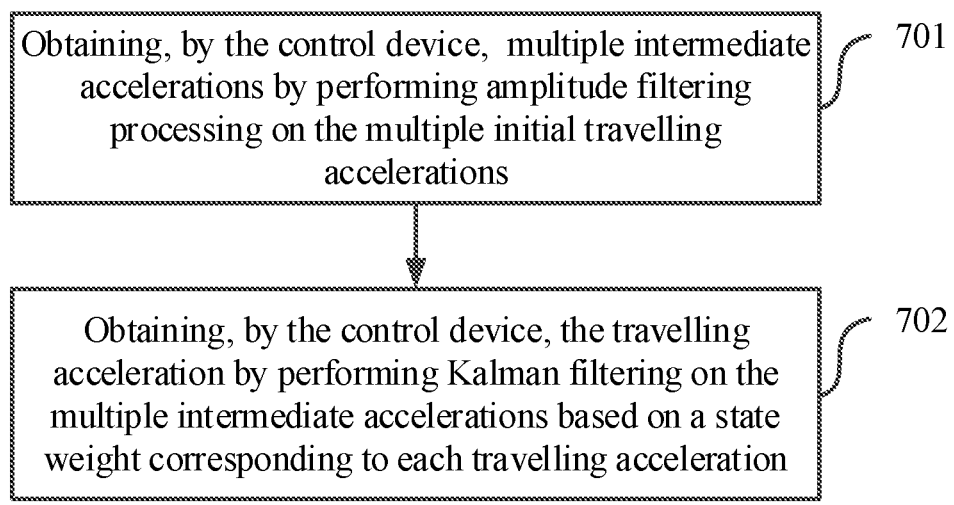
FIG. 7 is a flowchart of a of a train control method provided by an embodiment of the application.

As shown in FIG. 7, in a specific embodiment of the application, the above step 602, where the control device obtains the current travelling acceleration by performing filtering processing on the multiple initial travelling accelerations, may include the following steps 701 to 702.

Step 701: the control device obtains multiple intermediate accelerations by performing amplitude filtering processing on the multiple initial travelling accelerations.

The obtained initial travelling acceleration, without processing, may generally have multiple distorted points, resulting in large fluctuations in different travelling accelerations. A specific way to perform amplitude filtering processing on the obtained initial travelling acceleration in this embodiment may be as follows.

Firstly, a threshold range of acceleration may be determined according to the actual travelling performance of a vehicle, which has an upper bound $a_{lim+}$ and a lower bound $a_{lim-}$. It is then determined whether the obtained travelling acceleration is within the threshold range of acceleration. Each travelling acceleration is then processed according to the result of the determination. Under a first condition, if the obtained travelling acceleration is greater than the upper bound $a_{lim+}$, the obtained travelling acceleration should be decreased to $a_{lim+}$. Under a second condition, if the obtained travelling acceleration is smaller than the lower bound $a_{lim-}$, the obtained travelling acceleration should be increased to $a_{lim-}$. Under a third condition, if the obtained travelling acceleration is between the upper bound $a_{lim+}$ and the lower bound a value of the obtained travelling is kept unchanged.

In a specific embodiment, the upper bound $a_{lim+}$ of the travelling acceleration may be the maximum acceleration when the vehicle is towed (driven), for example, 2.0 meter per second squared (m/s²), and the lower bound $a_{lim-}$ of the travelling acceleration may be the maximum acceleration when the vehicle is braking, for example, 1.8 m/s². Different vehicles may have different parameters, and different values may be set according to actual conditions, which is not limited specifically in this embodiment.

Step 702: the control device obtains the current travelling acceleration by performing Kalman filtering on the multiple intermediate accelerations based on a state weight corresponding to each travelling acceleration.

A specific process of Kalman filtering in this embodiment may be as follows.

1) Multiple intermediate accelerations after amplitude filtering are obtained by step 701, and the state weight corresponding to each travelling parameter is obtained by step 202.

2) The travelling acceleration a of the current moment i may be calculated by the following equation (1):

$$a = a_i k_i + a_{i-1} k_{i-1} \tag{1}$$

In equation (1), a denotes the travelling acceleration of the current moment i, which may also be called a predicted travelling acceleration; $a_i$ denotes an intermediate travelling acceleration of the current moment i; and $k_i$ denotes a state weight corresponding to a travelling acceleration of the current moment i, $a_{i-1}$ denotes an intermediate travelling acceleration of a previous moment i−1 of the current moment i; and $k_{i-1}$ denotes a state weight corresponding to a travelling acceleration of the current moment previous moment i−1 of the current moment i.

3) The travelling acceleration a obtained at each moment may be calculated repeatedly and iteratively. Respective accelerations a obtained at different moments may be connected to form a smooth acceleration curve.

Figure 8:
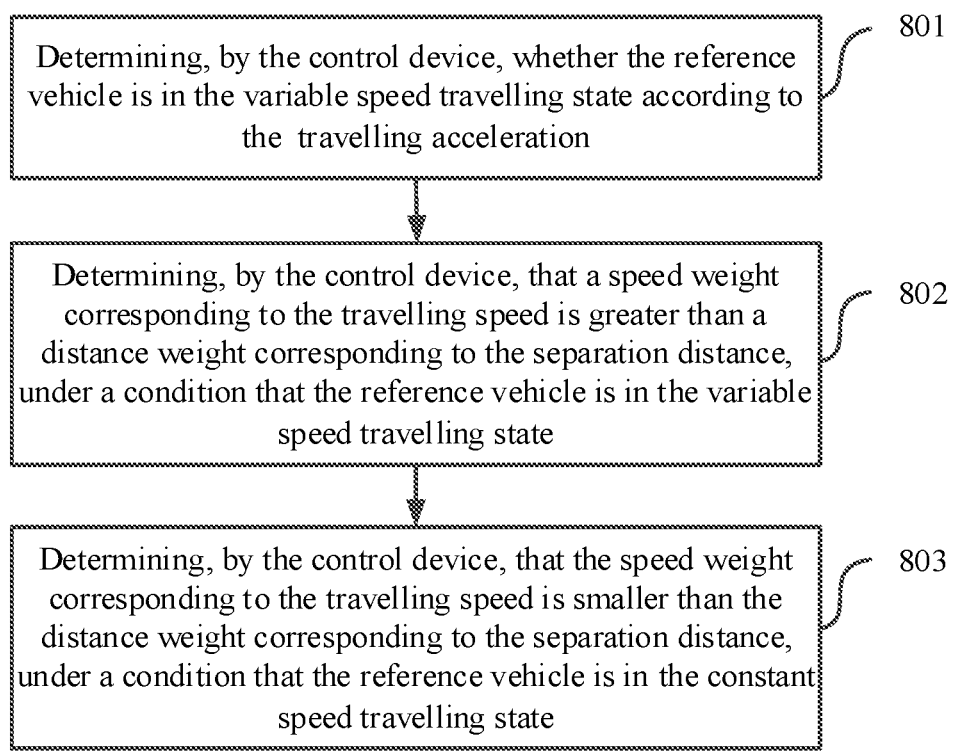
FIG. 8 is a flowchart of a of a train control method provided by an embodiment of the application.

The embodiment of the application can perform amplitude filtering processing on the multiple initial travelling accelerations firstly to obtain multiple intermediate accelerations, then perform Kalman filtering on the multiple intermediate accelerations based on a state weight corresponding to each travelling acceleration, and finally obtain the travelling acceleration that can be used to calculate the target travelling parameter. Performing Kalman filtering on the multiple intermediate accelerations based on a state weight corresponding to each travelling acceleration, i.e., continuously performing optimization and iteration of the current intermediate acceleration as measured based on the intermediate acceleration at the previous moment, enables to improve the reliability of the obtained travelling acceleration and further improve the reliability of the vehicle travelling state determined from the travelling acceleration. That is to say, the control reliability of the train control method provided by the embodiment of the application can be improved to a certain extent As shown in FIG. 8, in an optional embodiment of the application, the multiple travelling parameters may include at least a separation distance between the vehicle under control and the reference vehicle and a travelling speed of the reference vehicle. The above step 202, where the control device determines the state weight corresponding to each of the travelling parameters of the reference vehicle in the current travelling state according to the current travelling state, may include the following steps 801 to 803.

Step 801: the control device determines whether the reference vehicle is in the variable speed travelling state according to the current travelling acceleration.

The control device may pre-configure a threshold range of acceleration. If the current travelling acceleration is within the threshold range of acceleration, it is determined that the reference vehicle is currently in a constant speed travelling state; or if the current travelling acceleration exceeds the threshold range of acceleration, it is determined that the reference vehicle is currently in the variable speed travelling state. The threshold range of acceleration may be set according to actual experience, for example, it may be 5 m/s², of course, which is not limited specifically in this embodiment, and may be set specifically according to actual conditions.

Step 802: the control device determines that a speed weight corresponding to the travelling speed is greater than a distance weight corresponding to the separation distance, under a condition that the reference vehicle is in the variable speed travelling state.

Step 803: the control device determines that the speed weight corresponding to the travelling speed is smaller than the distance weight corresponding to the separation distance, under a condition that the reference vehicle is in the constant speed travelling state.

Control focuses may be different for vehicles in different travelling states, and correspondingly, travelling parameters that need to be focused on are also different.

In a first case, the reference vehicle is in an increasing speed travelling state. The reference vehicle (the vehicle in front) generally runs at a full level. If the vehicle under control (the vehicle behind) is adjusted at this time due to the distance between the vehicle and the vehicle in front, it is easy to increase a speed difference between the vehicle under control and a vehicle behind it and the larger speed difference would be maintained always at this stage, and a distance from the reference vehicle (the vehicle in front) would be further larger. Therefore, in the speed-increasing stage, the travelling speed should be a main target, and the separation distance should be a secondary target, and thus the speed weight corresponding to the travelling speed should be configured to be greater than the distance weight corresponding to the separation distance.

In a second case, the reference vehicle is in the constant speed travelling state. During the constant speed travelling, the speed of the reference vehicle remains stable. At this time, a main control target should be to maintain the distance, and a secondary target is to maintain the speed. Therefore, the speed weight corresponding to the travelling speed should be configured to be smaller than the distance weight corresponding to the separation distance.

In a third case, the reference vehicle is in a speed-decreasing travelling state. In the speed-decreasing stage, the speed of the reference vehicle (the vehicle in front) is generally relatively high, and it is easy to trigger an overspeed alarm. In order to avoid triggering the overspeed alarm, the speed should be the main consideration. Correspondingly, the speed weight corresponding to the travelling speed should be configured to be greater than the distance weight corresponding to the separation distance.

The embodiment of the application can configure different control weights according to actual travelling states, based on configuring the speed weight corresponding to the travelling speed to be greater than the distance weight corresponding to the separation distance in the variable speed travelling state, and configuring the speed weight corresponding to the travelling speed to be smaller than the distance weight corresponding to the separation distance in the constant speed travelling state, so as to improve the reliability of vehicle control by the train control method of the embodiment of the application to the maximum extent.

In an optional embodiment of the application, the multiple travelling parameters may further include the travelling acceleration and a travelling impact rate. Both an acceleration weight corresponding to the travelling acceleration and an impact rate weight corresponding to the travelling impact rate are smaller than the speed weight and the distance weight.

The embodiment of the application can improve the reliability of determination of the travelling state of the reference vehicle, by introducing the two travelling parameters, i.e., the travelling acceleration and travelling impact rate, and at the same time, configuring smaller state weights for the travelling acceleration and travelling impact rate, and combining with the above-mentioned speed weight and distance weight to determine the travelling state of the reference vehicle, so as to further improve the control reliability of the train control method provided by the embodiment of the application.

In an optional embodiment of the application, the above-mentioned control device may normalize each travelling parameter, based on the state weight corresponding to the travelling parameter.

Since differences between different travelling parameters are relatively great, the embodiment normalize each travelling parameter, to facilitate subsequent further processing and improve the processing efficiency. Therefore, the control efficiency of the train control method provided by the embodiment of the application can be further improved.

In a particular embodiment, the travelling speed in the travelling parameters can be normalized based on the following equation (2):

$$q_v = \left(\frac{v - v_{min}}{v_{max} - v_{min}}\right) * k_v \quad (2)$$

In the equation (2), $q_v$ denotes a normalized state weight of speed, $v$ denotes a current travelling speed, $v_{min}$ denotes the minimum travelling speed in a preset period, $v_{max}$ denotes the maximum travelling speed in the preset period, and $k_v$ denotes a speed weight corresponding to the current travelling state.

Similarly, other travelling parameters can be normalized in the same way to obtain a normalized distance weight $q_s$, acceleration weight $q_a$, and impact rate weight $q_F$.

Figure 9:
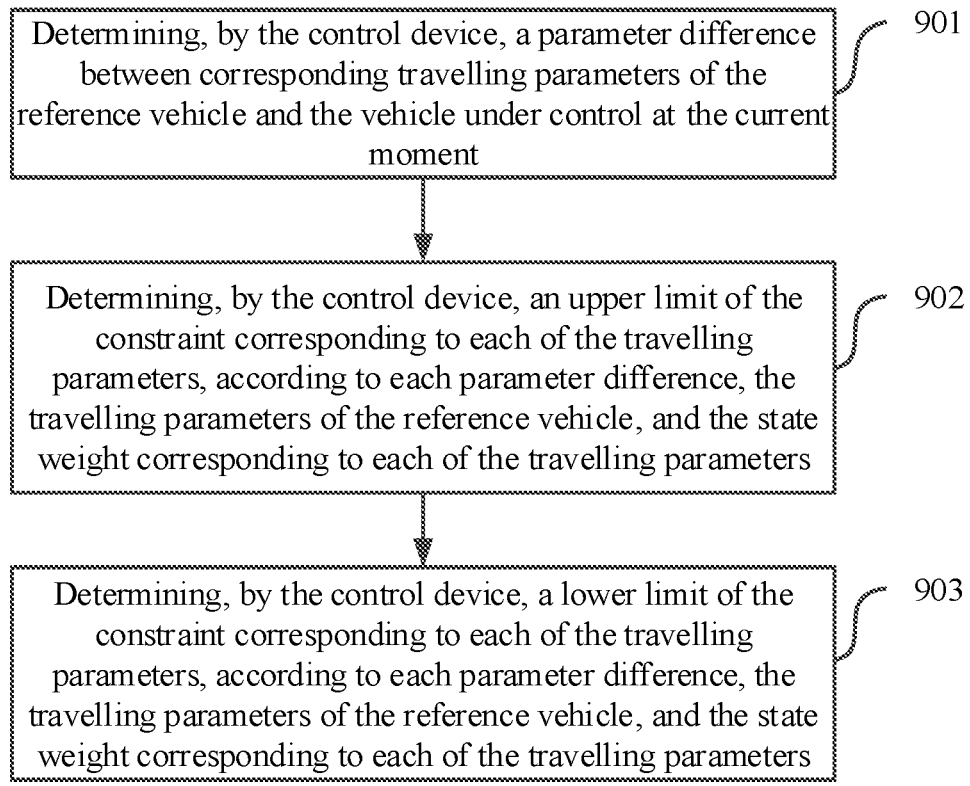
FIG. 9 is a flowchart of a of a train control method provided by an embodiment of the application.

As shown in FIG. 9, in an optional embodiment of the application, the above step 203, where the control device determines, according to the multiple travelling parameters and the state weight corresponding to each of the travelling parameters, a travelling constraint corresponding to each of the travelling parameters, may include the following steps 901 to 903.

Step 901: the control device determines a parameter difference between corresponding travelling parameters of the reference vehicle and the vehicle under control at the current moment.

Step 902: the control device determines an upper limit of the constraint corresponding to each of the travelling parameters, according to each parameter difference, the travelling parameters of the reference vehicle, and the state weight corresponding to each of the travelling parameters.

Step 903: the control device determines a lower limit of the constraint corresponding to each of the travelling parameters, according to each parameter difference, the travelling parameters of the reference vehicle, and the state weight corresponding to each of the travelling parameters.

For example, for the travelling speed in the travelling parameters, a corresponding lower limit of speed constraint can be determined by the following equation (3):

$$v_- = v_1 - abs(v_1 - v_2) * k_v \quad (3)$$

In the equation (3), $v_-$ denotes the lower limit of speed constraint, $v_1$ denotes the speed of the reference vehicle (the vehicle in front), $v_2$ denotes the speed of the vehicle under control (the vehicle behind), $k_v$ denotes the state weight of speed corresponding to the reference vehicle, and abs means an absolute value.

A corresponding upper limit of speed constraint can be determined by the following equation (4):

$$v_+ = v_2 - abs(v_1 - v_2) * k_v \quad (4)$$

In the equation (4), $v_+$ denotes the lower limit of speed constraint, $v_1$ denotes the speed of the reference vehicle (the vehicle in front), $v_2$ denotes the speed of the vehicle under control (the vehicle behind), $k_v$ denotes the state weight of speed corresponding to the reference vehicle, and abs means an absolute value.

Similarly, other travelling parameters can be determined in the same way, such as upper limits and lower limits of constraints corresponding to the travelling acceleration, travelling distance, travelling impact rate, etc. The embodiment of the application can determine the upper limit and lower limit of the constraint of each travelling parameter from the parameter difference, travelling parameters of the vehicle under control, and state weights corresponding to the travelling parameters, and thus ensure that a solution range is always kept within a reasonable range to solve the target travelling parameter within a more accurate range. Therefore, the convergence speed can be improved obviously, and the control efficiency of the train control method provided by the embodiment of the application can be further improved.

Figure 10:
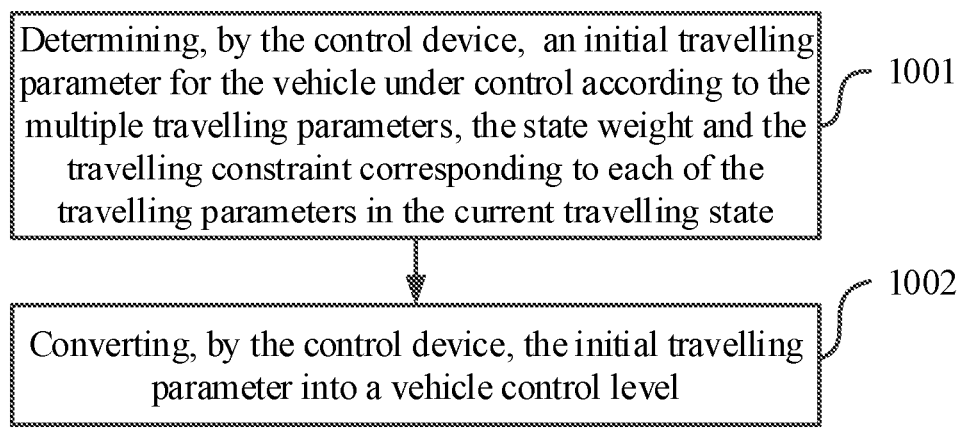
FIG. 10 is a flowchart of a of a train control method provided by an embodiment of the application.

As shown in FIG. 10, in an optional embodiment of the application, the above step 204, where the control device determines the target travelling parameter for the vehicle under control, according to the multiple travelling parameters, the state weight and the travelling constraint corresponding to each of the travelling parameters of the reference vehicle in the current travelling state, may include the following steps 1001 to 1002.

Step 1001: the control device determines an initial travelling parameter for the vehicle under control according to the multiple travelling parameters, the state weight and the travelling constraint corresponding to each of the travelling parameters of the reference vehicle in the current travelling state.

Step 1002: the control device converts the initial travelling parameter into a vehicle control level.

The vehicle control level is used to instruct the vehicle under control to travel. In this embodiment, the initial travelling parameter may be a travelling speed or travelling acceleration, and then the vehicle control level that can be used directly to control the vehicle may be determined through a corresponding relationship between the speed and the vehicle control level, or a corresponding relationship between the travelling acceleration and the vehicle control level. It is preferable that the initial travelling parameter in this embodiment is the travelling acceleration, since there is a one-to-one linear relationship between the travelling acceleration and the vehicle control level, and the corresponding vehicle control level can be determined directly from the current travelling acceleration.

The application may convert the obtained initial travelling parameter the vehicle under control into the vehicle control level that can be used directly to instruct the vehicle under control to travel, and may control the vehicle under control directly with the vehicle control level. Therefore, the control convenience of the train control method provided by the embodiment of the application can be improved.

It should be understood that although various steps in the flowcharts are displayed in sequence as indicated by arrows, these steps are not necessarily executed sequentially in the order indicated by the arrows. There is no strict order limitation for the execution of these steps, and these steps can be executed in other orders, unless stated explicitly herein. Moreover, at least a part of the steps in the drawings may include multiple sub-steps or multiple stages. These sub-steps or stages are not necessarily executed at the same time, but can be executed at different times. These sub-steps or stages are not necessarily executed sequentially, but can be executed alternately or by turns with at least a part of other steps or sub-steps or stages of other steps.

Figure 11:
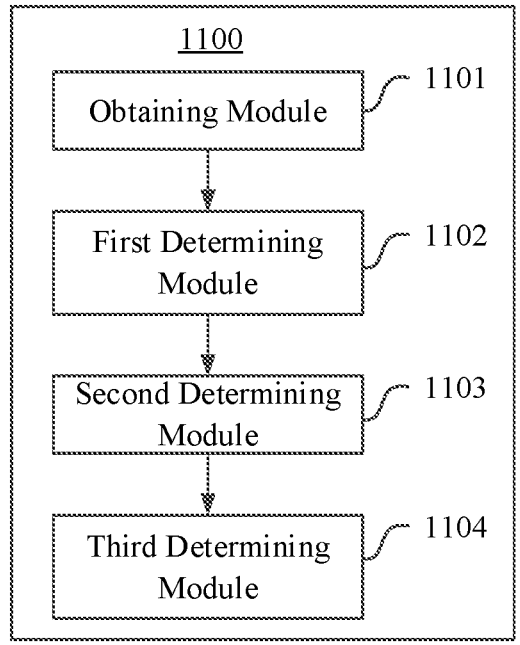
FIG. 11 is a schematic structural diagram of a virtual marshalling train control system provided by an embodiment of the application.

As shown in FIG. 11, an embodiment of the application provides a virtual marshalling train control system 1100, including an obtaining module 1101, a first determining module 1102, a second determining module 1103, and a third determining module 1104.

The obtaining module 1101 is configured to obtain multiple travelling parameters of a vehicle under control and a reference vehicle at a current moment. The multiple travelling parameters includes at least a travelling speed or a travelling acceleration. The reference vehicle is located in front of the vehicle under control and is adjacent to the vehicle under control.

The first determining module 1102 is configured to determine a current travelling state of the reference vehicle according to the multiple travelling parameters, and determine a state weight corresponding to each of the travelling parameters of the reference vehicle in the current travelling state according to the current travelling state. The travelling state comprises at least a variable speed travelling state and a constant speed travelling state.

The second determining module 1103 is configured to determine, according to the multiple travelling parameters and the state weight corresponding to each of the travelling parameters of the reference vehicle in the current travelling state, a travelling constraint corresponding to each of the travelling parameters.

The third determining module 1104 is configured to determine a target travelling parameter for the vehicle under control, according to the multiple travelling parameters, the state weight and the travelling constraint corresponding to each of the travelling parameters of the reference vehicle in the current travelling state. The target travelling parameter is used to instruct the vehicle under control to travel.

Specific limitations of the above-mentioned virtual marshalling train control system 1100 may be referred to the above limitations of the train control method, which will not be repeated here. The various modules in the above-mentioned virtual marshalling train control system 1100 can be implemented in whole or in part by software, hardware, and a combination thereof. The above-mentioned modules may be embedded in or independent of a processor in the computer device as hardware, or may be stored in a memory of the computer device as software, so that the processor can call and execute operations corresponding to the above-mentioned modules.

Figure 12:
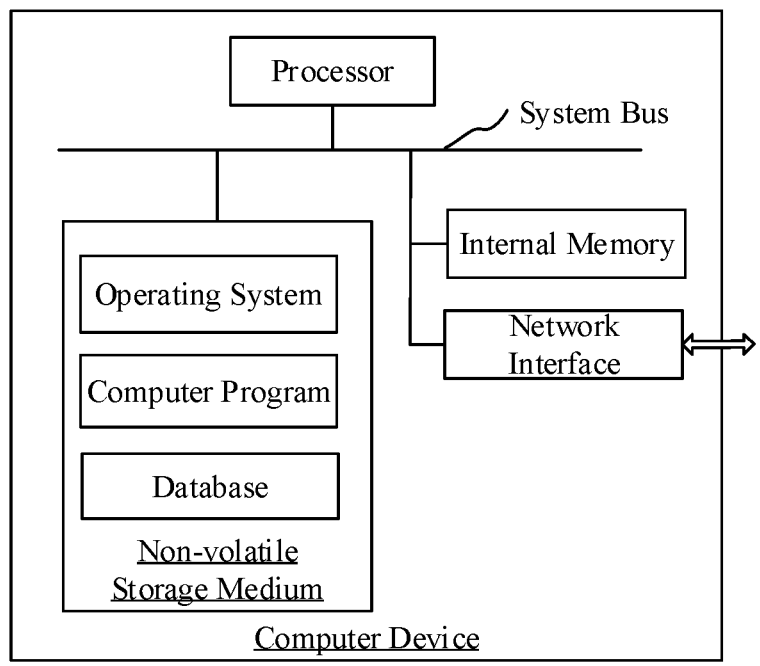
FIG. 12 is a schematic structural diagram of a computer device provided by an embodiment of the application.

In an embodiment, a computer device is provided. FIG. 12 shows an internal structural diagram of the computer device. The computer device includes a processor, a memory, a network interface, and a database connected through a system bus. Among them, the processor of the computer device may be used to provide calculation and control capabilities. The memory of the computer device may include a non-volatile storage medium and an internal memory. The non-volatile storage medium may store an operating system, a computer program, and a database. The internal memory may provide an environment for the execution of the operating system and computer program in the non-volatile storage medium. The database of the computer device may be used to store data. The network interface of the computer device may be used to communicate with an external terminal through a network connection. The computer program, when executed by the processor, may realize the above train control method. It includes a memory and a processor. The memory has a computer program stored thereon. The processor implements any step of the above train control method when executing the computer program.

In an embodiment, a computer-readable storage medium is provided. The computer-readable storage medium has a computer program stored thereon. The computer program, when executed by a processor, causes any step of the above train control method to be implemented.

Those skilled in the art should understand that the embodiments of the application can be provided as methods, systems, or computer program products. Therefore, the application may adopt a form of a complete hardware embodiment, a complete software embodiment, or an embodiment combining software and hardware. Moreover, the application may adopt a form of a computer program product implemented on one or more computer-usable storage media (including but not limited to disk storage, CD-ROM, optical storage, etc.) containing computer-usable program codes.

The application is described with reference to flowcharts and/or block diagrams of methods, devices (systems), and computer program products according to embodiments of the application. It should be understood that each process and/or block in the flowcharts and/or block diagrams, and combinations of processes and/or blocks in the flowcharts and/or block diagrams can be realized by computer program instructions. These computer program instructions can be provided to a processor of a general-purpose computer, a special-purpose computer, an embedded processor, or other programmable data processing equipment to generate a machine, so that the instructions executed by the processor of the computer or other programmable data processing equipment generate means for implementing functions specified in one or more processes in the flowcharts and/or one or more blocks in the block diagrams.

These computer program instructions can also be stored in a computer-readable memory that can direct a computer or other programmable data processing equipment to work in a specific manner, so that the instructions stored in the computer-readable memory generate a manufacture article including instruction means. The instruction means can implement functions specified in one or more processes in the flowcharts and/or one or more blocks in the block diagrams.

These computer program instructions can also be loaded on a computer or other programmable data processing equipment, enabling a series of operation steps to be executed on the computer or other programmable equipment to generate computer-implemented processing, so that the instructions executed on the computer or other programmable equipment can provide steps to implement functions specified in one or more processes in the flowcharts and/or one or more blocks in the block diagrams.

Although preferred embodiments of the application have been described, those skilled in the art can make additional changes and modifications to these embodiments once they learn the basic inventive concept. Therefore, the appended claims are intended to be interpreted as including the preferred embodiments and all changes and modifications falling within the scope of the application.

Obviously, those skilled in the art can make various modifications and modifications to the application without departing from the spirit and scope of the application. As such, if these modifications and variations of the application fall within the scope of the claims of the application and their equivalent technologies, these modifications and variations are intended to be included in the application.

What is claimed is:

1. A train control method, being applied to a virtual marshalling train control system, the method comprising:
   obtaining multiple travelling parameters of a vehicle under control and a reference vehicle at a current moment, the multiple travelling parameters comprising at least a travelling speed or a travelling acceleration, wherein the reference vehicle is located in front of the vehicle under control and is adjacent to the vehicle under control;
   determining a current travelling state of the reference vehicle according to the multiple travelling parameters, and determining a state weight corresponding to each of the travelling parameters of the reference vehicle in the current travelling state according to the current travelling state, wherein the travelling state comprises at least a variable speed travelling state and a constant speed travelling state;
   determining, according to the multiple travelling parameters and the state weight corresponding to each of the travelling parameters of the reference vehicle in the current travelling state, a travelling constraint corresponding to each of the travelling parameters; and
   determining a target travelling parameter for the vehicle under control, according to the multiple travelling parameters, the state weight and the travelling constraint corresponding to each of the travelling parameters of the reference vehicle in the current travelling state, wherein the target travelling parameter is used to instruct the vehicle under control to travel.

2. The train control method according to claim 1, wherein determining the target travelling parameter for the vehicle under control, according to the multiple travelling parameters, the state weight and the travelling constraint corresponding to each of the travelling parameters of the reference vehicle in the current travelling state comprises:
   modifying parameters of an initial prediction model according to the state weight and the travelling constraint corresponding to each of the travelling parameters, to obtain a target prediction model; and
   inputting the multiple travelling parameters to the target prediction model for solution, to obtain the target travelling parameter.

3. The train control method according to claim 1, wherein obtaining the multiple travelling parameters of the vehicle under control and the reference vehicle at the current moment comprises:
   obtaining multiple travelling speeds of the reference vehicle within a preset period; and
   determining a current travelling acceleration of the reference vehicle according to the multiple travelling speeds.

4. The train control method according to claim 3, wherein determining the current travelling acceleration of the reference vehicle according to the multiple travelling speeds comprises:
   obtaining multiple initial travelling accelerations by performing second-order differential filtering processing on the multiple travelling speeds; and obtaining the current travelling acceleration by performing filtering processing on the multiple initial travelling accelerations.

5. The train control method according to claim 4, wherein obtaining the current travelling acceleration by performing filtering processing on the multiple initial travelling accelerations comprises:
   obtaining multiple intermediate accelerations by performing amplitude filtering processing on the multiple initial travelling accelerations; and
   obtaining the current travelling acceleration by performing Kalman filtering on the multiple intermediate accelerations based on a state weight corresponding to each travelling acceleration.

6. The train control method according to claim 3, wherein the multiple travelling parameters comprise at least a separation distance between the vehicle under control and the reference vehicle and a travelling speed of the reference vehicle; and determining the state weight corresponding to each of the travelling parameters of the reference vehicle in the current travelling state according to the current travelling state comprises:
   determining whether the reference vehicle is in the variable speed travelling state according to the current travelling acceleration;
   determining that a speed weight corresponding to the travelling speed is greater than a distance weight corresponding to the separation distance, under a condition that the reference vehicle is in the variable speed travelling state; and
   determining that the speed weight corresponding to the travelling speed is smaller than the distance weight corresponding to the separation distance, under a condition that the reference vehicle is in the constant speed travelling state.

7. The train control method according to claim 6, wherein the multiple travelling parameters further comprise the travelling acceleration and a travelling impact rate, wherein both an acceleration weight corresponding to the travelling acceleration and an impact rate weight corresponding to the travelling impact rate are smaller than the speed weight and the distance weight.

8. The control method according to claim 1, wherein the method further comprises:
   normalizing each travelling parameter, based on the state weight corresponding to the travelling parameter.

9. The train control method according to claim 1, wherein determining the current travelling state of the reference vehicle according to the multiple travelling parameters, and determining the state weight corresponding to each of the travelling parameters of the reference vehicle in the current travelling state according to the current travelling state, and determining the travelling constraint corresponding to each of the travelling parameters comprise:
   determining a parameter difference between corresponding travelling parameters of the reference vehicle and the vehicle under control at the current moment;
   determining an upper limit of the constraint corresponding to each of the travelling parameters, according to each parameter difference, the travelling parameters of the reference vehicle, and the state weight corresponding to each of the travelling parameters; and
   determining a lower limit of the constraint corresponding to each of the travelling parameters, according to each parameter difference, the travelling parameters of the reference vehicle, and the state weight corresponding to each of the travelling parameters.

10. The train control method according to claim 1, wherein determining the target travelling parameter for the vehicle under control, according to the multiple travelling parameters, the state weight and the travelling constraint corresponding to each of the travelling parameters of the reference vehicle in the current travelling state comprises:
    determining an initial travelling parameter for the vehicle under control according to the multiple travelling parameters, the state weight and the travelling constraint corresponding to each of the travelling parameters of the reference vehicle in the current travelling state; and
    converting the initial travelling parameter into a vehicle control level, wherein the vehicle control level is used to instruct the vehicle under control to travel.

11. A computer device, comprising:
    a memory, having a computer program stored thereon, wherein; and
    a processor, configured to execute the computer program to:
      obtain multiple travelling parameters of a vehicle under control and a reference vehicle at a current moment, the multiple travelling parameters comprising at least a travelling speed or a travelling acceleration, wherein the reference vehicle is located in front of the vehicle under control and is adjacent to the vehicle under control;
      determine a current travelling state of the reference vehicle according to the multiple travelling parameters, and determining a state weight corresponding to each of the travelling parameters of the reference vehicle in the current travelling state according to the current travelling state, wherein the travelling state comprises at least a variable speed travelling state and a constant speed travelling state;
      determine, according to the multiple travelling parameters and the state weight corresponding to each of the travelling parameters of the reference vehicle in the current travelling state, a travelling constraint corresponding to each of the travelling parameters; and
      determine a target travelling parameter for the vehicle under control, according to the multiple travelling parameters, the state weight and the travelling constraint corresponding to each of the travelling parameters of the reference vehicle in the current travelling state, wherein the target travelling parameter is used to instruct the vehicle under control to travel.

12. The computer device according to claim 11, wherein determining the target travelling parameter for the vehicle under control, according to the multiple travelling parameters, the state weight and the travelling constraint corresponding to each of the travelling parameters of the reference vehicle in the current travelling state comprises:
    modifying parameters of an initial prediction model according to the state weight and the travelling constraint corresponding to each of the travelling parameters, to obtain a target prediction model; and
    inputting the multiple travelling parameters to the target prediction model for solution, to obtain the target travelling parameter.

13. The computer device according to claim 11, wherein obtaining the multiple travelling parameters of the vehicle under control and the reference vehicle at the current moment comprises:
    obtaining multiple travelling speeds of the reference vehicle within a preset period; and determining a current travelling acceleration of the reference vehicle according to the multiple travelling speeds.

14. The computer device according to claim 13, wherein determining the current travelling acceleration of the reference vehicle according to the multiple travelling speeds comprises:

obtaining multiple initial travelling accelerations by performing second-order differential filtering processing on the multiple travelling speeds; and obtaining the current travelling acceleration by performing filtering processing on the multiple initial travelling accelerations.

15. The computer device according to claim 14, wherein obtaining the current travelling acceleration by performing filtering processing on the multiple initial travelling accelerations comprises:

obtaining multiple intermediate accelerations by performing amplitude filtering processing on the multiple initial travelling accelerations; and obtaining the current travelling acceleration by performing Kalman filtering on the multiple intermediate accelerations based on a state weight corresponding to each travelling acceleration.

16. A computer-readable storage medium having a computer program stored thereon, wherein the computer program, when executed by a processor, causes operations for train control to be implemented, the operations comprising:

obtaining multiple travelling parameters of a vehicle under control and a reference vehicle at a current moment, the multiple travelling parameters comprising at least a travelling speed or a travelling acceleration, wherein the reference vehicle is located in front of the vehicle under control and is adjacent to the vehicle under control;

determining a current travelling state of the reference vehicle according to the multiple travelling parameters, and determining a state weight corresponding to each of the travelling parameters of the reference vehicle in the current travelling state according to the current travelling state, wherein the travelling state comprises at least a variable speed travelling state and a constant speed travelling state;

determining, according to the multiple travelling parameters and the state weight corresponding to each of the travelling parameters of the reference vehicle in the current travelling state, a travelling constraint corresponding to each of the travelling parameters; and determining a target travelling parameter for the vehicle under control, according to the multiple travelling parameters, the state weight and the travelling constraint corresponding to each of the travelling parameters of the reference vehicle in the current travelling state, wherein the target travelling parameter is used to instruct the vehicle under control to travel.

17. The computer-readable storage medium according to claim 16, wherein determining the target travelling parameter for the vehicle under control, according to the multiple travelling parameters, the state weight and the travelling constraint corresponding to each of the travelling parameters of the reference vehicle in the current travelling state comprises:

modifying parameters of an initial prediction model according to the state weight and the travelling constraint corresponding to each of the travelling parameters, to obtain a target prediction model; and inputting the multiple travelling parameters to the target prediction model for solution, to obtain the target travelling parameter.

18. The computer-readable storage medium according to claim 16, wherein obtaining the multiple travelling parameters of the vehicle under control and the reference vehicle at the current moment comprises:

obtaining multiple travelling speeds of the reference vehicle within a preset period; and determining a current travelling acceleration of the reference vehicle according to the multiple travelling speeds.

19. The computer-readable storage medium according to claim 18, wherein determining the current travelling acceleration of the reference vehicle according to the multiple travelling speeds comprises:

obtaining multiple initial travelling accelerations by performing second-order differential filtering processing on the multiple travelling speeds; and obtaining the current travelling acceleration by performing filtering processing on the multiple initial travelling accelerations.

20. The computer-readable storage medium according to claim 19, wherein obtaining the current travelling acceleration by performing filtering processing on the multiple initial travelling accelerations comprises:

obtaining multiple intermediate accelerations by performing amplitude filtering processing on the multiple initial travelling accelerations; and obtaining the current travelling acceleration by performing Kalman filtering on the multiple intermediate accelerations based on a state weight corresponding to each travelling acceleration.

* * * * *